(12) United States Patent
Bosstick

(10) Patent No.: US 7,845,718 B1
(45) Date of Patent: Dec. 7, 2010

(54) BED FORMED FROM FACE TO FACE CHAIRS

(76) Inventor: Gerald Bosstick, P.O. Box 9835, Rancho Santa Fe, CA (US) 92067

( * ) Notice: Subject to any disclaimer, the term of this patent is extended or adjusted under 35 U.S.C. 154(b) by 119 days.

(21) Appl. No.: 11/775,047

(22) Filed: Jul. 9, 2007

(51) Int. Cl.
A47C 13/00 (2006.01)

(52) U.S. Cl. .......................... 297/67; 297/118; 297/245

(58) Field of Classification Search .................. 297/63, 297/67, 118, 245, 452.41, 423.4, 423.39, 297/423.41, 188.2, 188.21, 188.12, 188.01, 297/157.1, DIG. 8; 5/681, 710, 118
See application file for complete search history.

(56) References Cited

U.S. PATENT DOCUMENTS

| | | | | |
|---|---|---|---|---|
| 535,365 A | * | 3/1895 | Fadner | 190/2 |
| 988,513 A | * | 4/1911 | Shea et al. | 297/63 |
| 1,983,119 A | * | 12/1934 | Boyd | 297/63 |
| 2,023,173 A | * | 12/1935 | Hiener | 297/188.01 |
| 2,163,198 A | * | 6/1939 | Gossard | 297/245 |
| 2,177,174 A | * | 10/1939 | Eccles | 297/423.45 |
| 2,648,072 A | * | 8/1953 | De Blieux | 5/94 |
| 3,058,769 A | * | 10/1962 | Willson | 296/156 |
| 3,097,876 A | * | 7/1963 | Willson | 296/156 |
| 3,600,725 A | * | 8/1971 | McCartney | 5/94 |
| 3,648,306 A | * | 3/1972 | Auerbach | 5/94 |
| 3,978,530 A | | 9/1976 | Amarantos | |
| 4,131,313 A | * | 12/1978 | Jacobs | 297/188.2 |
| 5,181,286 A | * | 1/1993 | McNulty | 5/8 |
| 5,185,896 A | * | 2/1993 | Bonda | 5/118 |
| 7,246,393 B2 | * | 7/2007 | Westendorf et al. | 5/706 |
| 2007/0102975 A1 | * | 5/2007 | Gardner | 297/245 |

FOREIGN PATENT DOCUMENTS

| | | | |
|---|---|---|---|
| DE | 2526473 | | 12/1976 |
| DE | 2526473 A | * | 12/1976 |
| DE | 3637648 A1 | * | 5/1987 |

* cited by examiner

Primary Examiner—Joseph F Edell

(57) ABSTRACT

The present invention is a device which quickly and inexpensively transforms two, face to face aircraft passenger seats into a horizontal bed surface adapted to provide a user with a flat surface upon which a user may lie on their back, side or stomach. A collapsible foundation block is adapted to form a space filling function as to a space between two face to face seats that are secured to a floor structure forming a horizontal surface. The foundation block is preferably inflatable and is supported from a floor surface between the two face to face seats, whereafter a supporting structure of the foundation block rises to a top surface generally parallel to the floor. The elevation of the top surface is approximately a level of a top surface of seat cushions of the two facing seats.

13 Claims, 8 Drawing Sheets

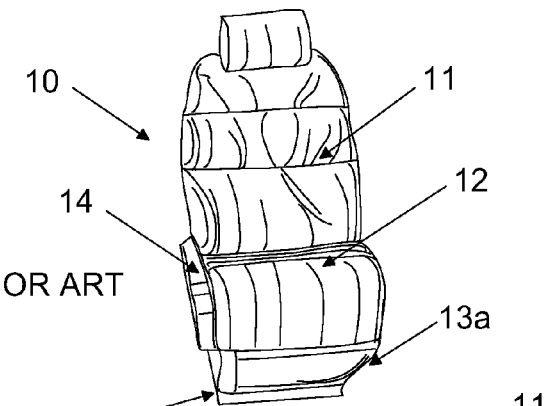
FIG. 1 - PRIOR ART
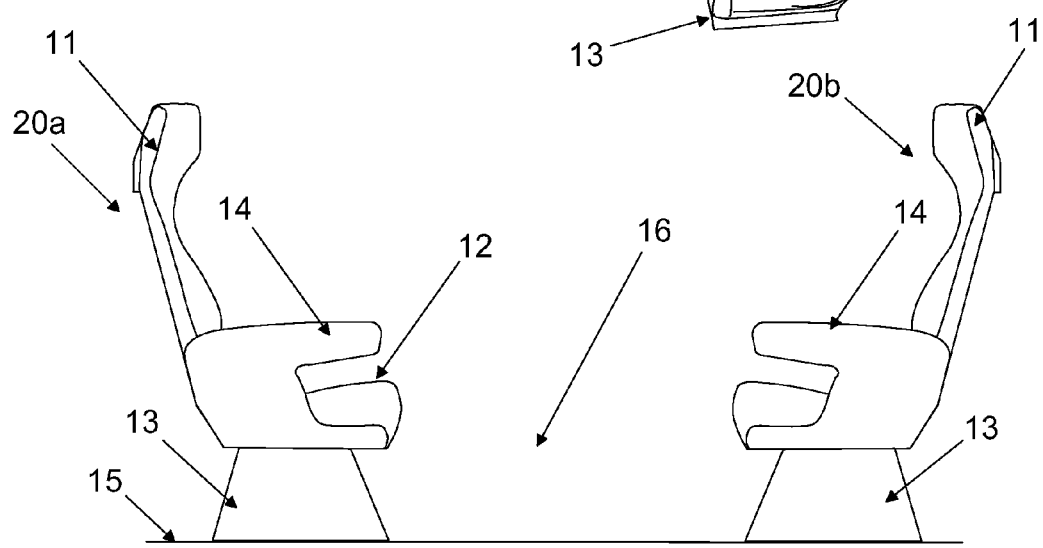
FIG. 2 - PRIOR ART
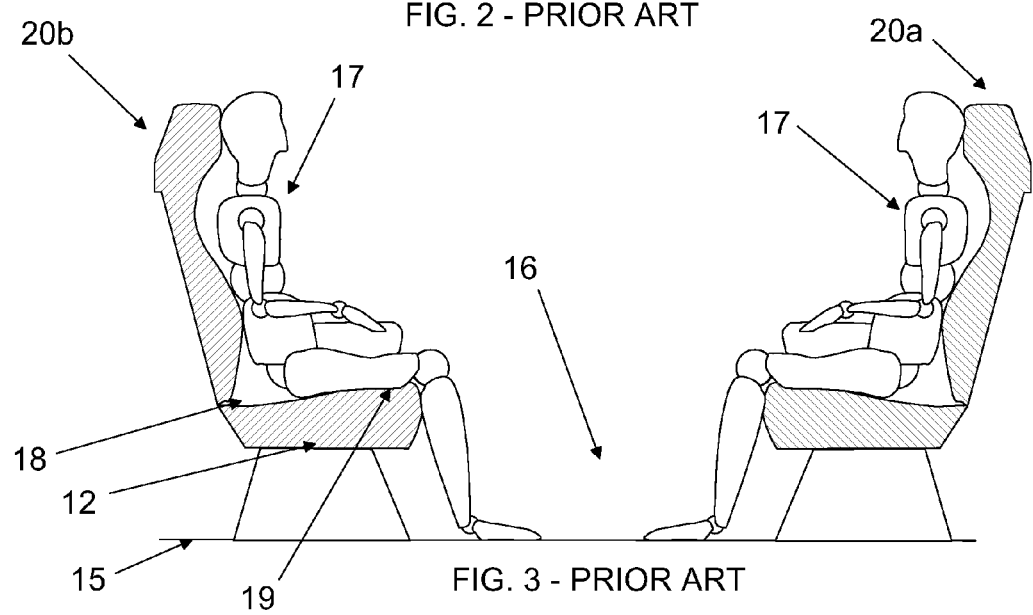
FIG. 3 - PRIOR ART

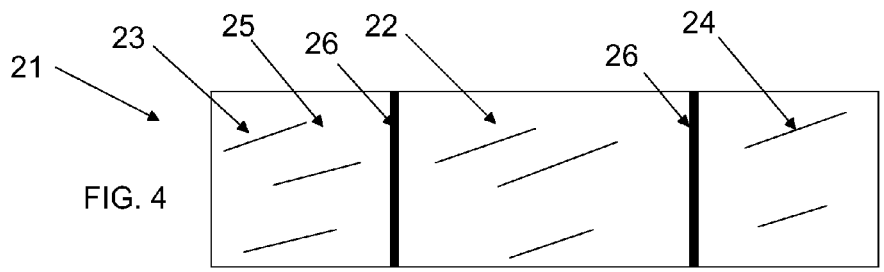
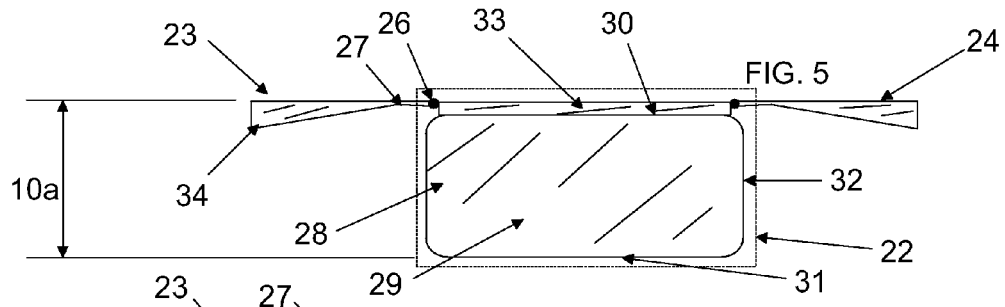
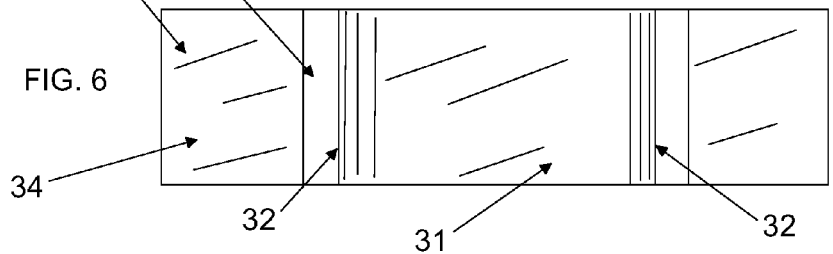
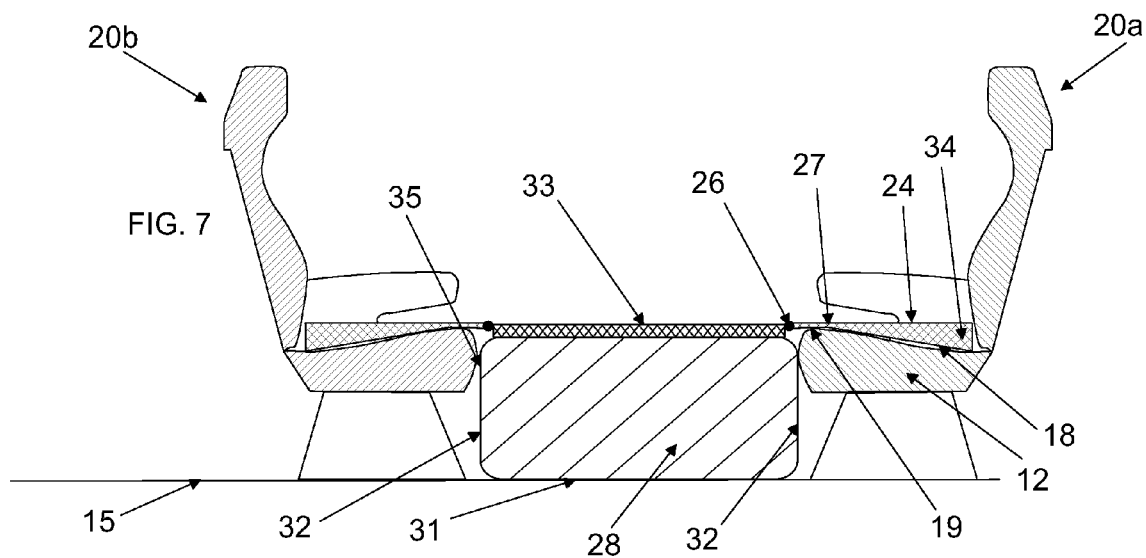

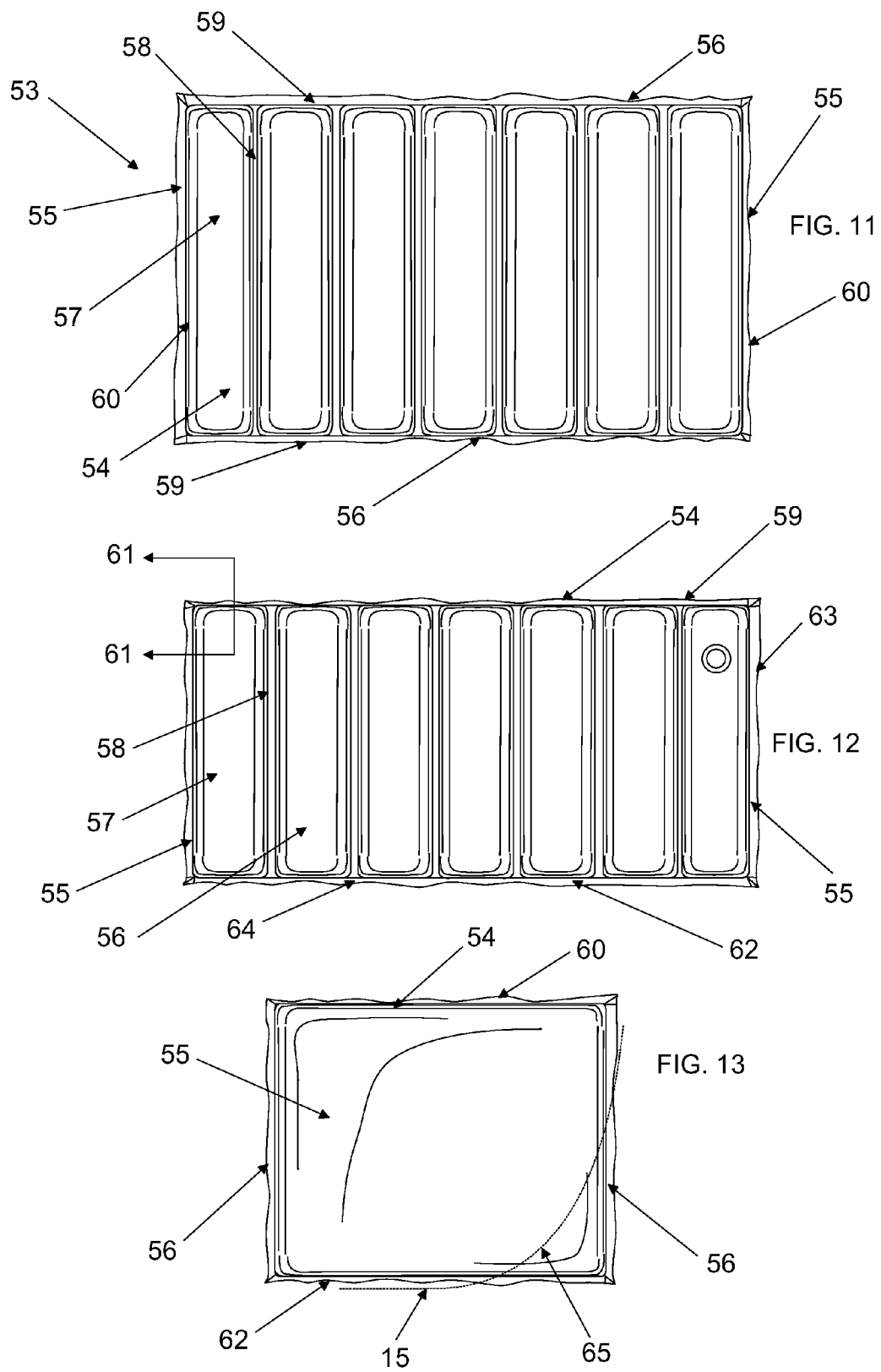

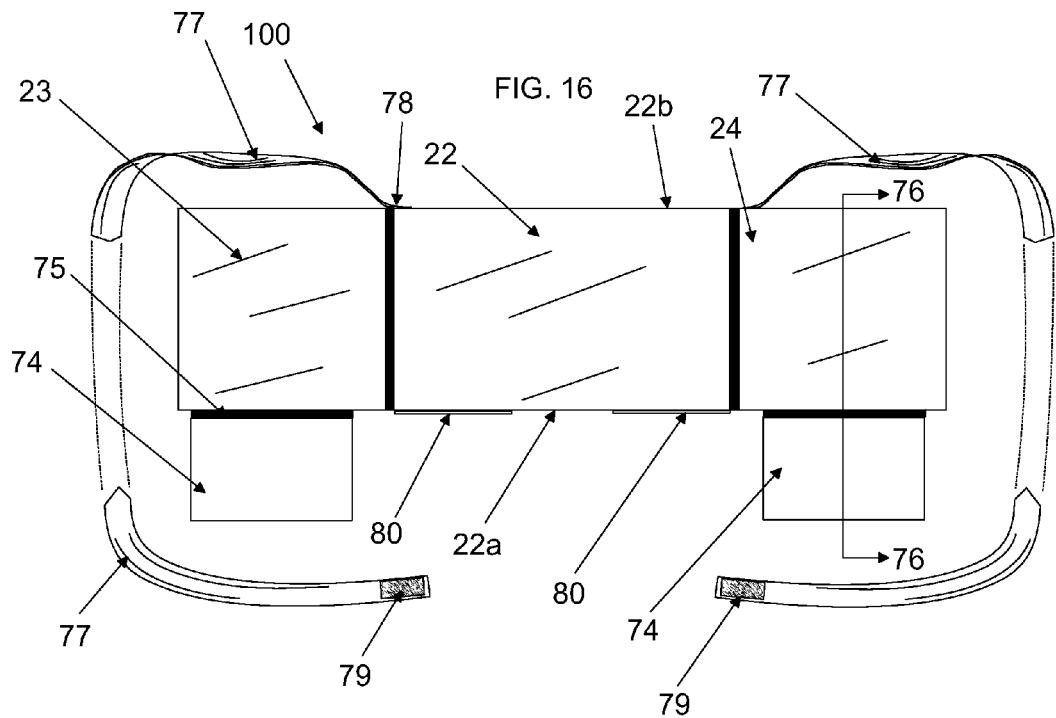
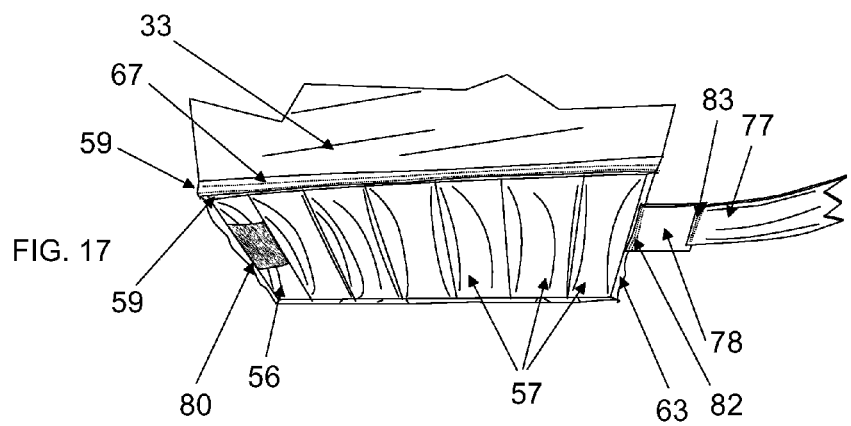

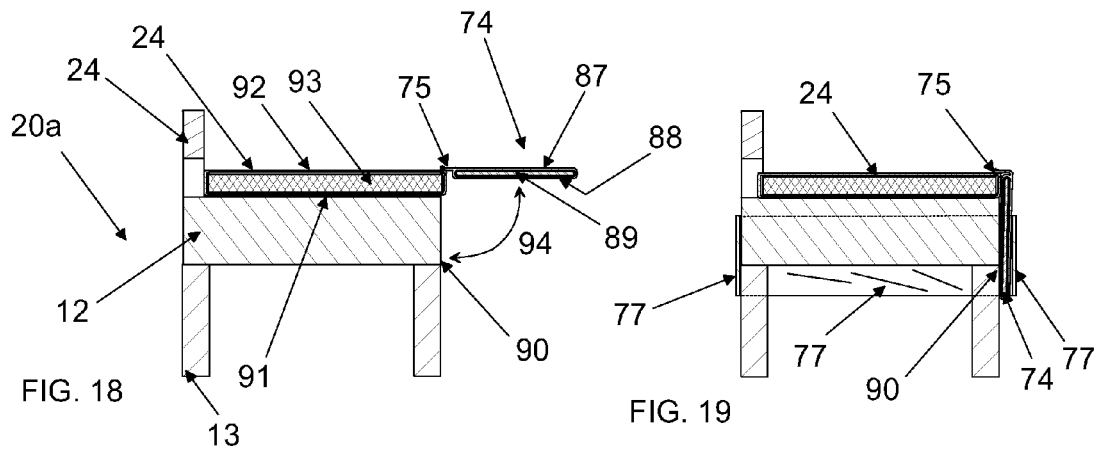
FIG. 18
FIG. 19
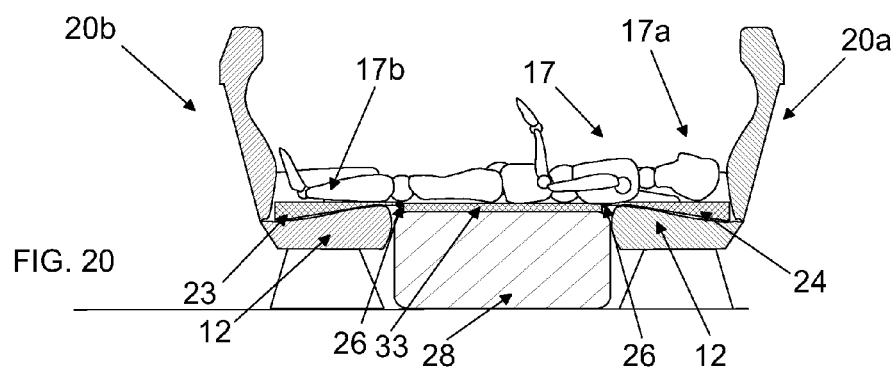
FIG. 20
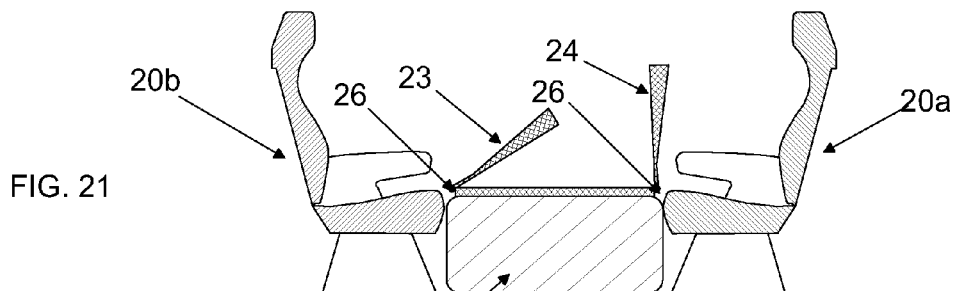
FIG. 21
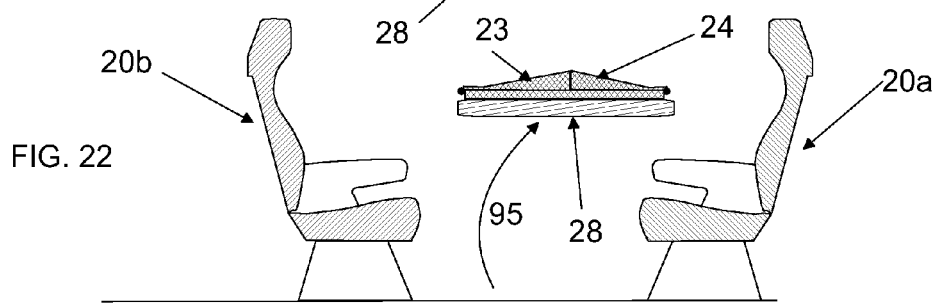
FIG. 22

BED FORMED FROM FACE TO FACE CHAIRS

FIELD OF THE INVENTION

The present invention relates to bed structures having an inflatable or collapsible component.

BACKGROUND OF THE INVENTION

Aircraft seating for passengers is most efficiently laid out with all passengers seated side by side, with all passenger seats facing forward. A typical aircraft passenger seat comprises a set of supports anchored to a cabin floor, whereupon is secured a seat bottom securing a seat cushion. The seat cushion is a critical aspect of passenger orientation on the seat itself. The top surface of the seat cushion declines rearward from a front edge to a back edge of the seat cushion so that a passenger is urged against a curved seat back when seated. The change in elevation may be slight (such as about one inch change in elevation for coach seats) or may be very accentuated (2-4 inches for executive or first class seats). Seat declination in aircraft passenger seating serves a safety function, in that a passenger is less likely to be ejected from the seat when a safety belt is secured across the passenger's lap. As such, seat declination from front to rear on the seat cushion is a essential aspect of aircraft passenger seating.

A cost of efficiency in aircraft passenger seating layout is that most passengers do find it preferable. Arranging the seats side by side and front to back creates a perception of a space that is cramped and confining. In response, some aircraft manufacturers have created a space-inefficient solution in placing two aircraft passenger seats face to face, one facing to the front of the aircraft and one facing a rear of the aircraft. The two seats are necessarily spaced apart by a substantial distance to prevent stretched legs of two face to face passengers from contacting each other. The very purpose of providing two face to face seats is for luxury and comfort. It would do little good to provide such face to face seats where the occupants were interfering with each other's leg space. Similarly, the very structure of the seats themselves should provide an above average level of postural and cushioning comfort to complement the luxury appointments of the face to face seating arrangement. As such, the seat cushions of face to face aircraft passenger seats typically provide very substantial cushioning and a rather substantial seat cushion rearward declination to match.

Thus, the current state of the art in providing a luxury level of comfort with two aircraft passenger seats facing each other is well known to create a substantial distance between the two facing seats and to provide each seat with a fairly deep rearward declination of the seat cushion surface with relatively soft cushion material.

Long flights induce passengers to nap or to sleep for long periods of time. Even the most luxurious of aircraft have generally failed to provide a sleeping surface where a typical adult can stretch out their full length and rest on a horizontal surface. When such a horizontal surface is described herein, it refers to a surface generally horizontal with a cabin floor of the aircraft. The prior art has offered solutions which appear to be impractical or excessively expensive. A simple solution has been to eliminate seats in favor of a space long enough to install a bed structure. The amount of horizontal space required for installation of a bed structure in an aircraft has made this solution impractical. Equally impractical has been adaptation of aircraft passenger seats so that mechanical manipulation results in a bed structure. The high cost of aircraft passenger seats, i.e., usually from $20,000 to $40,000, requires an undue investment in a mechanically convertible passenger seat or seats, an investment which may not be recoverable or which may dissuade the business jet purchaser from making such an investment.

An unfortunate feature of mechanically convertible seats in the prior art to form a bed structure has been their lack of comfort. The articulated and segmented nature of aircraft passenger seats into at least two major curved surfaces, i.e., the seat back and the seat cushion, prevents their use in forming a flat bed surface. Moving these two parts of an aircraft passenger seat into a pseudo-flat surface eliminates the ability of a passenger to lay on their side or stomach, in that the surfaces are formed in to conform to a human back and seat.

There is a need for a device which quickly and inexpensively transforms aircraft passenger seating into a horizontal bed surface adapted to provide a user with a flat surface upon which a user may lie on their back, side or stomach.

SUMMARY OF THE INVENTION

The present invention is a device which quickly and inexpensively transforms two, face to face aircraft passenger seats into a horizontal bed surface adapted to provide a user with a flat surface upon which a user may lie on their back, side or stomach. A collapsible foundation block is adapted to form a space filling function as to a space between two face to face seats that are secured to a floor structure forming a horizontal surface. The foundation block is preferably inflatable and is supported from a floor surface between the two face to face seats, whereafter a supporting structure of the foundation block rises to a top surface generally parallel to the floor. The elevation of the top surface is approximately a level of a top surface of seat cushions of the two facing seats.

In its simplest form, a barely acceptable bed surface is formed by inclusion of the foundation block in a space between two face to face aircraft passenger seats. The bed surface is formed by, starting a head portion, a top surface of a seat cushion of a left seat, the top surface of the foundation block, and a top surface of a seat cushion of a right seat, where the right and left seats face each other and are separated by a space of about two to four feet. However, three features of this simplest example are undesirable.

First, the foundation block is not fixed in place relative to the floor and the seats, allowing the foundation block to shift and perhaps become dislodged when a user lies on it. Aircraft travel sometimes includes turbulent conditions or a user may shift their weight from side to side, either of which could cause the foundation block to be ejected from under a user.

Second, a user will perceive the breaks in continuity, material and cushioning perception between the top surfaces of the seats and the top surface of the foundation block. These breaks and changes are ultimately a cause of discomfort over a long period of rest upon them.

Third, seat declination of the seat cushions will cause a user's head to be angled downward from a user's neck, which would typically be supported on a front, elevated edge of the seat cushion. The declination is so severe that a user could not tolerate that position for long. While a small pillow inserted into the rear portion of the seat cushion could tend to provide an effectively more level overall top surface for a user's head, the pillow introduces yet another discontinuity in the overall resting surface.

A bed surface is expected by a user to comprise a generally flat surface from head to feet which is horizontal relative to a floor.

In one form of the invention bed device, the above discontinuities and seat declinations are eliminated. A top pad, preferably enclosed in a soft but durable fabric envelope, is attached to the entire top surface of the foundation block, forming a relatively planar first bed surface parallel to the floor. Adjacent edges of the top pad lie substantial adjacent to a upper elevation of the seat cushions of each seat, i.e., at a front edge of the seat cushion. Connected by hinges or flexible hinge-like attachment to the adjacent edges are connection edges of filler pads. Filler pads are adapted to lie on the top surface of a declination type seat and substantially conform, on a underside, to the declination curvature. A second bed surface of the filler pads is a flat topside and substantially co-planar with the first bed surface. The entire bed surface upon which a user may lie on their back, side or stomach consists of a first bed surface of the top pad and two second bed surfaces of the filler pads adjacent to and substantially co-planar with the top pad. The flexible or hinge connection between the top pad and the filler pads eliminates sensed discontinuities in the entire bed surface.

In another form of the invention, the foundation block comprises a generally rectangular shape with a top wall, bottom wall, two end walls (abutting or adjacent to the fronts of the seats), and two side walls. Securing means secures the foundation block to the seats. A form of the securing means is one or more generally horizontal flexible belts that extend, first, around lateral sides and a back side of each seat and, second, continue to connections with each side wall of the foundation block. The invention foundation block preferably fills a space between front edges of opposing seat cushions of the passenger seats and is supported by a floor surface between those seats. Adding a securing belt or belts to fix the foundation block to the floor mounted seats provides a very secure base, comprising the two seat cushions and the foundation block, upon which the above top pad and filler pads are supported to provide a flat entire bed surface.

A further embodiment of securing means comprises a lateral extension from a side of one or both of the filler pads. The lateral extension is flexibly attached to the side of the filler pad and is adapted to fold down from the side of the filler pad and to be secured to a side of the seat below the level of the top of the seat cushion. Securing the lateral extension to the side of the seat can be accomplished by overlaying it with a flexible belt extending from sidewalls of the foundation block and around the sides and back of the seat structure. Alternately, the lateral extension can be secured to an adjacent surface of a right or left side of the seat by hook and loop fastening means, latches, snaps, or similar devices. It is preferred to arrange placement of the lateral extension on a side of the filler pad so that the lateral extension will lie on a side of the seat without an armrest and/or on a side nearest to a aircraft cabin wall. The lateral extensions, when secured to the right or left side of a seat, dramatically reduces movement of the foundation block relative to the seats. The lateral extension structurally connects a right or left side of the filler pad with the lower frame of the seat, where the filler pad is connected with the top pad and the top pad is fixed to a top surface of the foundation block. Using the lateral extensions in combination with securing means for the foundation block, it is unnecessary to fix the bottom of the foundation block to the floor in order to obtain a structure sufficiently secure to support the weight of a user and thereafter remain in location between the two facing seats. Undue side to side shifting of the foundation block is essentially eliminated.

Objects of the invention are:
1. to provide an inflatable foundation block capable of filling a space between two spaced apart, facing chairs, such as are found on commercial jetliner or business jet aircraft, to form a relatively flat surface, including the seat surfaces of the chairs, to form a bed surface;
2. to provide a pair of filler pads flexibly attached to top end edges of the foundation block that, when the foundation block is in inflated and in place, extend onto the seat surfaces to provide a more uniform bed surface from one end an entire bed surface to the other;
3. to provide securing flanges or lateral extensions that extend from a lateral edge of the filler pads and down against a right or left side of a seat to reduce side to side movement of the entire assembly when in place;
4. to provide two securing straps, each extending from one lateral sidewall of the foundation block, around a backside of a seat or chair and then attaching to the other lateral sidewall of the foundation block to secure the foundation block to a chairs or seats (two straps are provided, one for each chair); and
5. to provide a fabric covered, foam top cushion for the foundation block top surface that is effectively continuous with the tops of the two filler pads so that a user experiences a uniform softness of the bed surface from one end to the other.

A user can lie down securely, with or without a straps about their body, for long periods of time on the bed surface. The foundation block can be deflated and other extensions from it folded into a small volume for compact storage.

BRIEF DESCRIPTION OF THE DRAWINGS

FIG. 1 is a perspective view of a prior art aircraft passenger seat, showing a left side curved inward for placing the seat next to an inwardly curved cabin wall.

FIG. 2 is an aisle side view of two prior art facing aircraft passenger seats fixed to a cabin floor, defining a space between them.

FIG. 3 is a cross section opposite side view of the seats of FIG. 2 and showing human figure shapes facing each other on said seats.

FIGS. 4, 5, and 6 are, respectively, top, side and bottom views of one embodiment of a foundation block with a top pad fixed to its top surface and two filler pads rotatably connected with the assembly of the foundation block and top pad.

FIG. 7 is the seats of FIG. 3 with a cross section view of the device of FIG. 5 showing a substantially planar bed surface capable of comfortably supporting a user in a lying down position.

FIGS. 11, 12 and 13 are, respectively, top, side and end views of a preferred embodiment of the foundation block.

FIG. 16 is the device of FIG. 4 with the addition to two lateral extensions and two flexible belts for securing the foundation block to the seats.

FIG. 17 is a top perspective view of a portion of the foundation block of FIG. 12 showing an origin and releasable attachment section of a side of the foundation block which is topped with a top pad.

FIG. 18 is section 76 of a filler pad of FIG. 16 including a section of a seat of FIG. 3 upon which the filler pad is supported.

FIG. 19 is the view of FIG. 18 with the lateral extension folded down against a left side of the seat and secured there by the flexible belt of FIG. 16.

FIG. 20 shows the view of FIG. 7 with a reclining human shape on the bed surface.

FIG. 21 shows the view of FIG. 7 with two filler pads rotating about their connections to the top pad.

FIG. 22 shows the view of FIG. 21 with the two filler pads rotated so that their top surfaces lie upon a top of the top pad and the foundation block is deflated, providing a small volume storage size for the invention device.

DETAILED DESCRIPTION OF THE INVENTION

Figure 8:
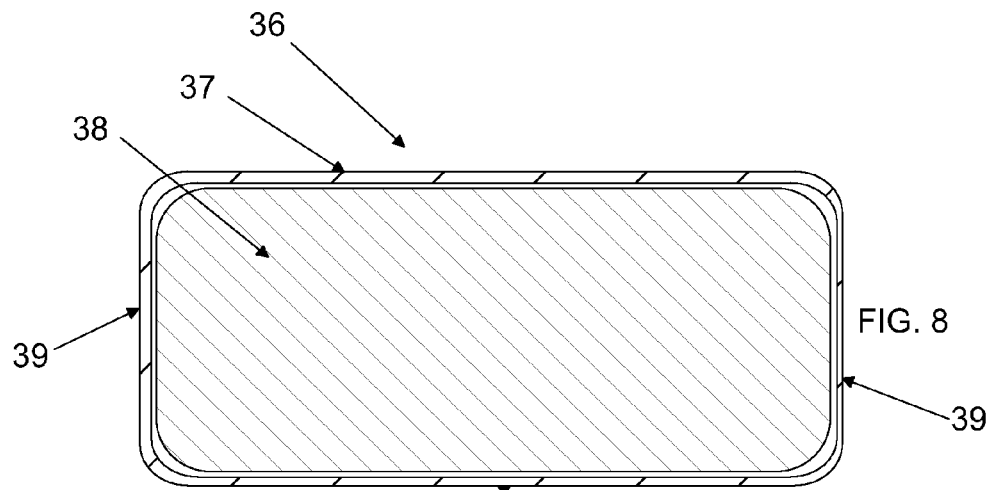
FIG. 8 is a side cross section view of one embodiment of the foundation block having a flexible fabric exterior and a material filled interior.

The invention is now discussed with reference to the figures.

FIG. 1 is a perspective view of a prior art aircraft passenger seat 10, showing a left side 13 a curved inward for placing the seat next to an inwardly curved cabin wall. Seat 10 generally comprises a slightly concave back 11 and seat 12 having a elevated part at a front edge. Seat 10 is adapted to be fixed to a cabin floor by support frame 13 and has an armrest 14 on only one side, a right side.

FIG. 2 is an aisle side view of two prior art facing aircraft passenger seats similar the seat of FIG. 1, where seats 20a and 20b face each other and are each fixed to a cabin floor 15 by support frames 13, defining a space 16 between the seats 20a and 20b.

FIG. 3 is a cross section opposite side view of seats 20a and 20b of FIG. 2, showing that seat cushions 12 comprise higher elevation front edge 19 and a lower elevation back part 18, resulting in a declination from edge 19 to part 18. Human figures 17 are shown seated on seats 20a and 20b demonstrating the usefulness of the various curvatures of the seating surfaces of seats 20a and 20b to a seated human figure. It is apparent that such multiple curved surfaces, if the seat back 11 were reclined into a horizontal position, would be of little use to a user desiring to lay on their side or stomach.

FIGS. 4, 5, and 6 are, respectively, top, side and bottom views of one embodiment 21 of center section 22 comprising a foundation block 28 and a top pad 33 attached to cover a top surface 30 of the foundation block 28. Foundation block 28 comprises a top surface 30, a bottom surface 31, end walls 32 and side walls 29. Filler pads 23 and 24 are connected by a rotatable connection 26 to a top edge zone of center section 22, where filler pads 23 and 24 are rotatable about an axis formed by connection 26. Connection 26 preferably comprises a connection of fabric covering filler pads 23 and 24 to fabric covering top pad 33. Filler pads 23 and 24 each comprise a thickened back section 34 and a thinner front edge section 27. Filler pads 23 and 24 are about a width of seat cushions upon which they will be supported. Top pad 33 is about the width of the filler pads 23 and 24. Elevation 10a is a height from the bottom surface 31 of foundation block 28 to a substantially co-planar set of three top surfaces, i.e., a top surface of top pad 33 and top surfaces of filler pads 23 and 24.

Elevation 10a is equal to or greater than the elevation of the seat cushion front edge 19 of FIG. 3 from floor 15. As such, as in FIG. 7, the embodiment 21 of FIG. 5 fills the space 16 shown in FIG. 3 and fills a space defined by the declination of seat cushion surfaces to form a horizontal bed surface capable of supporting the weight of a reclining human figure.

FIG. 7 is the seats 20a and 20b of FIG. 3 with a cross section view of the embodiment 21 of FIG. 5 showing a substantially planar bed surface capable of comfortably supporting a user in a lying down position. Bottom surface 31 of foundation block 28 is supported on floor 15 between seats 20a and 20b. End walls 32 contact or abut seats 20a and 20b at interfaces 35, providing resistance to movement of the foundation block 28 in the direction of the seats 20a and 20b. Filler pads 23 and 24 have undersides generally conforming to and supported by a top surface of the seat cushion 12. It is apparent from inspection of FIG. 7 that a bed surface comprising a substantially co-planar set of three top surfaces, i.e., a top surface of top pad 33 and top surfaces of filler pads 23 and 24, is fully supported from floor 15 and seat cushions 12, which are supported via support frames 13. The foundation block 28 is adapted to support hundreds of pounds of weight of a human torso with relatively little depression on top surface 30 when a user reclines on the bed surface. Therefore, a user's head (supported on one filler pad) is maintained at about the same level as a user's torso and thighs (supported by the top pad 33 and foundation block 28) and legs and feet (supported by the other filler pad). It has been found that forming foundation block 28 as an inflatable air mattress with internal structure baffles provides sufficient structural strength to accomplish the objects of the invention.

FIG. 8 is a side cross section view of one embodiment of the foundation block 36 having a flexible fabric exterior with sides 37, 39 and 40 and a material 38 filled interior. Material 38 may comprise a memory elastomer foam block or similar structure to accomplish the objects of the invention.

Figure 9:
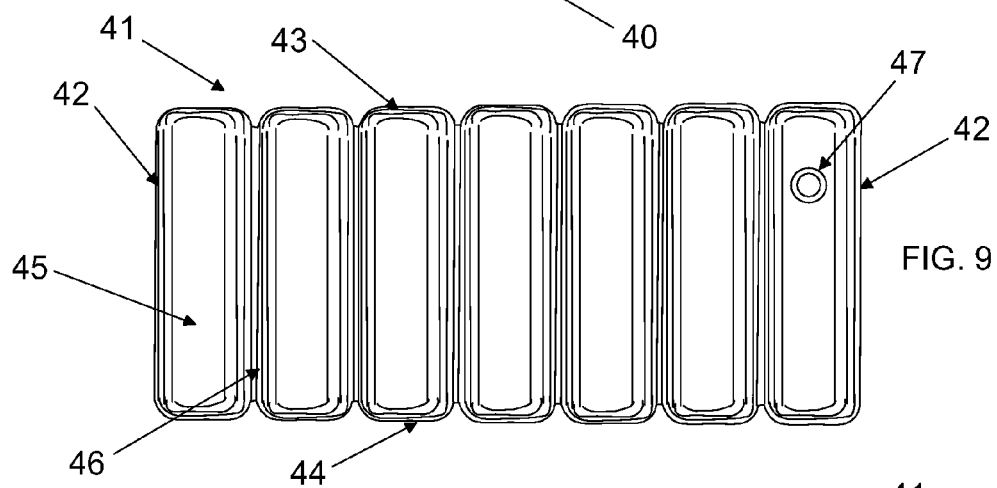
FIG. 9 is a side view of an inflatable foundation block.
Figure 10:
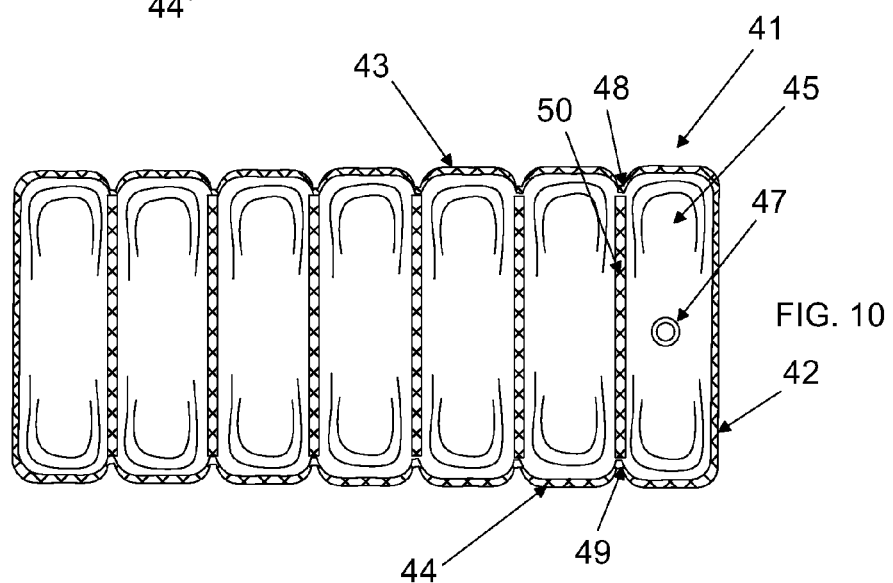
FIG. 10 is a side cross section view of the foundation block of FIG. 9.

FIG. 9 is a side view of an inflatable foundation block 41 with end walls 42, top surface 43, bottom surface 44, and side walls 45 with a removable cap 47 which allows for inflation and deflation of block 41. FIG. 10 shows baffles 46 extending to connect top surface 43 at connection 48, side walls 45 at connection 50 and bottom surface 44 at connection 49 to form an inflated structure capable of supporting hundreds of pounds of weight of a human user of the invention devices.

FIGS. 11, 12 and 13 are, respectively, top, side and end views of a preferred embodiment of the foundation block 53. Block 53 is generally rectangular and is formed of four sheets of flexible polymer material adapted to be used in air mattresses, such as polyvinyl chloride, where each sheet is joined by thermal or radio wave welding to another sheet along an edge. Block 53 comprises a top surface 54, end walls 55, bottom surface 62 and side walls 56, whose flexible sheets joined at their edges result in excess layers 59, 60, 64, and 63. Baffles 58 separate the internal space of block 53 into seven structural sections 57. FIG. 13 shows a broken line, a portion of which indicates floor 15 and an upward sloped portion of which indicates a cabin wall 65. A portion of block 53 down and to the right of cabin wall 65 is eliminated and the end walls, one side wall, and bottom surface changed in form to allow placing block 53 next to such a curved or sloped cabin wall. FIG. 1 shows a similar adaptation for seat 10. The change of block 53 indicated by cabin wall 65 in FIG. 13 is intended to adapt block 53 for use between such seats 10 as shown in FIG. 1.

Figure 14:
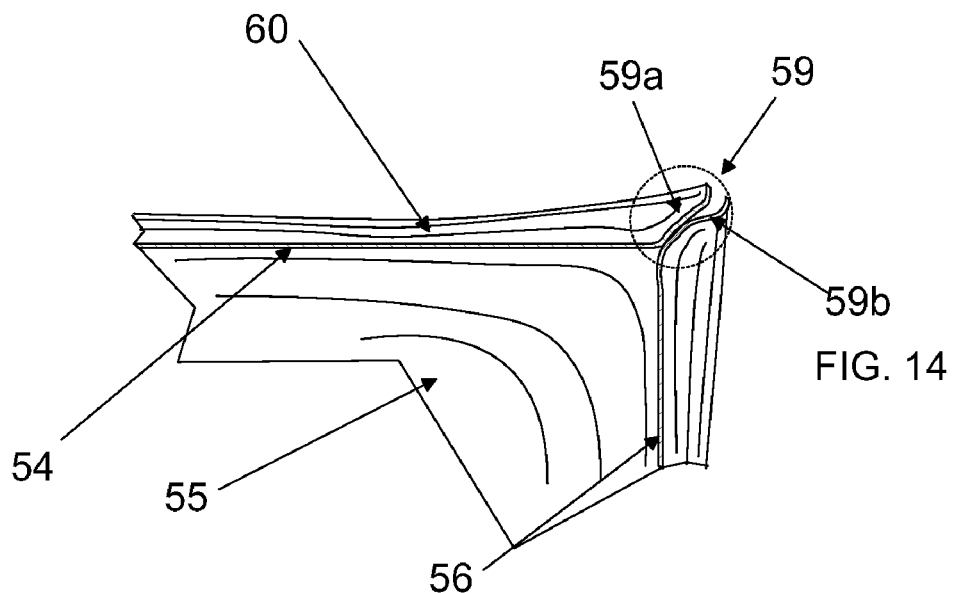
FIG. 14 is a partial view of section 61 of FIG. 12.
Figure 15:
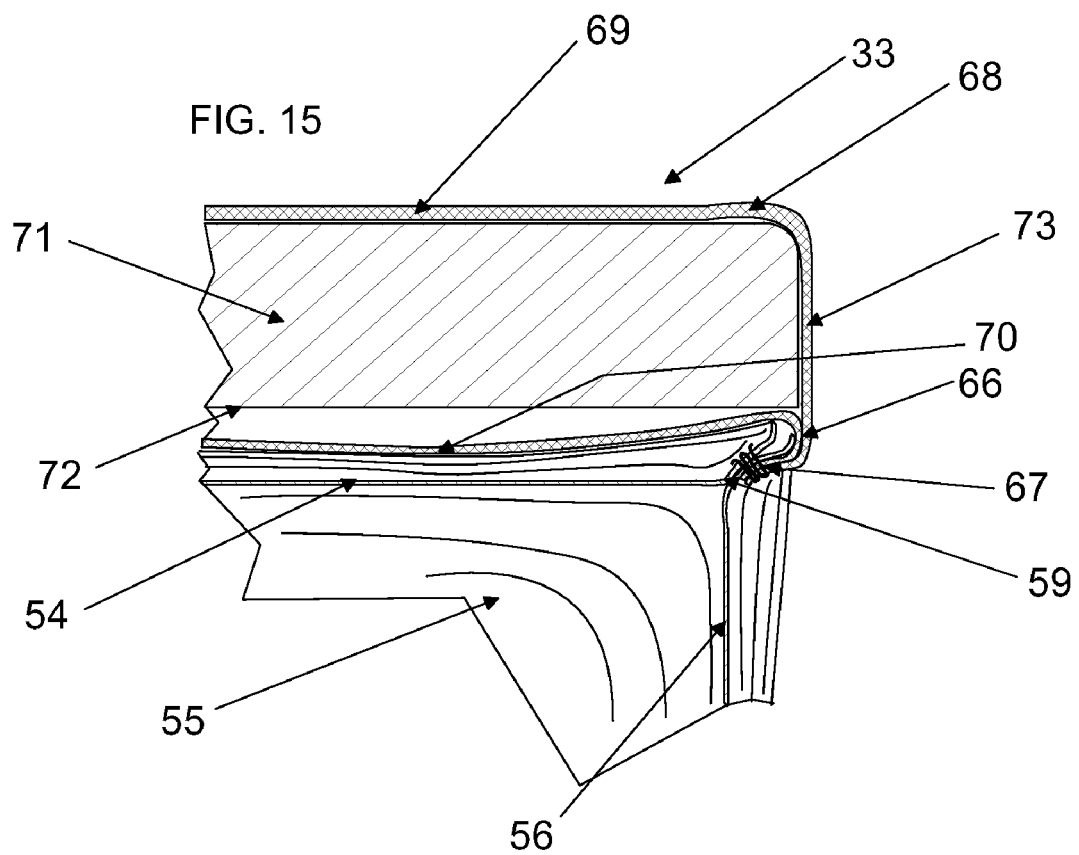
FIG. 15 is the view of FIG. 14 with the addition of a fabric covered top pad.

FIG. 14 is a partial view of section 61 of FIG. 12, where excess layer 59 is shown formed of joined sheets of top surface 54 and side wall 56 at sections 59a and 59b. FIG. 15 is the view of FIG. 14 showing means for attaching a top pad 33 to the foundation block by enclosing a rectangular piece of memory foam 71 with fabric sheets 68 and 70, both of whose edges are sewn together to the excess layer 59. Bed surface layer 69 and sides 73 are drawn sufficiently tightly so that foam 71 will not be dislodged by typical movement of a user reclining upon it. Top pad 33 may also be secured to a top surface of a foundation block by means of adhesive or similar attachment methods.

FIG. 16 is the invention embodiment 100 having the center section 22 and filler pads 23 and 24 of FIG. 4 with the addition to two lateral extensions 74 and two flexible belts 77 for securing a center section 22 to the seats shown in FIGS. 2 and 3. Lateral extensions 74 are connected by flexible, rotatable connection 75 to a side edges of filler pads 23 and 24. Flexible belts 77 are connected at a connection end 78 to side wall 22a of center section 22. Belts 77 are adapted to extend around right and left sides and back sides of facing seats to which the invention assembly 100 will be engaged to form a bed surface, where a releasable attachment ends 79 are adapted to be fixed to attachment sections 80 shown on side wall 22a of center section 22. FIG. 17 is a top perspective view of a portion of the foundation block 53 of FIGS. 11, 12 and 13 showing an connection end 78 connected with layers 63 at stitching 82 and with belt 77 at stitching 83 and attachment section 80 on side wall 56.

FIG. 18 is section 76 of FIG. 16 showing filler pad 24 as comprising a foam pad 93 enclosed in flexible fabric envelope 92. Lateral extension 74 comprises a rigid plate 89 enclosed in a flexible fabric envelope 87 and having an underside 88 and a rotatable connection 75 by way of a fabric connection between envelopes 92 and 87. Connection 75 is adapted to allow lateral extension 74 rotate along path 94 so that underside 88 is adjacent to seat side 90, as shown in FIG. 19. FIG. 19 further shows belt 77 in cross section urging lateral extension 74 against side 90.

FIG. 20 shows the view of FIG. 7 with a reclining human shape 17 on the bed surface, with a head and shoulders portion 17a supported on filler pad 24, a torso and thighs section supported on top pad 33, and a legs and feet portion 17b supported on filler pad 23. From this position, a user may lie comfortably on their side or stomach.

FIGS. 21 and 22 show collapsing and storage steps for the device of FIG. 20. FIG. 21 shows that pads 23 and 24 fold upward and over toward top pad 33 by connections 26. FIG. 22 shows foundation block 28 deflated into a compressed position and pads 23 and 24 folded on top of top pad 33 so that the entire device is stowable into small space.

Figure 23:
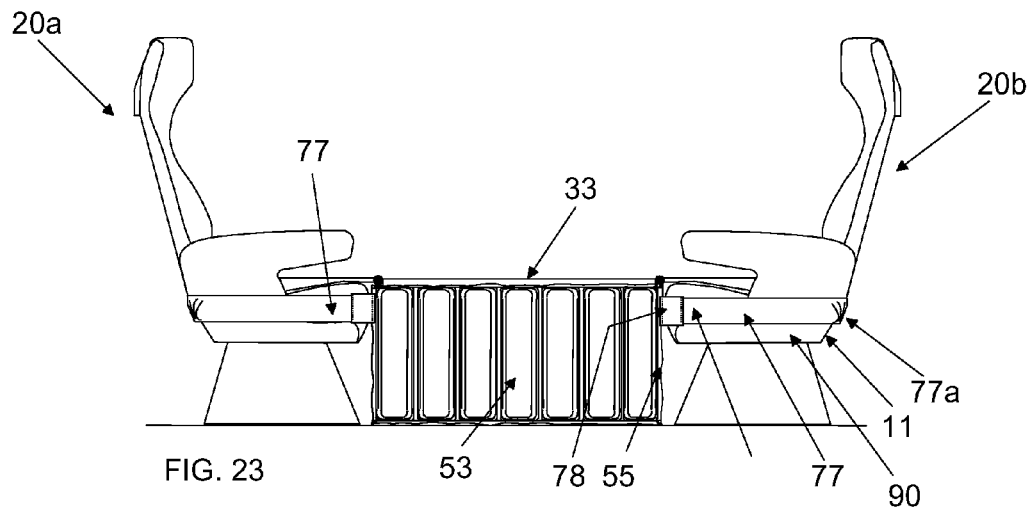
FIG. 23 shows aisle side view of the seats of FIG. 2 where the device of FIG. 16 is shown in a secured position with flexible belts extending around sides and a back of the seat structure from an origin attachment to a side wall of the inflated foundation block.

FIG. 23 shows aisle side view of the seats 20a and 20b of FIG. 2 with the assembly 100 of FIG. 16 in a secured position on those seats. Flexible belts 77 are secured at attachment 78 and extend around sides 90 to a back section 77a of belt 77 which engages a backside structure of seats 20a and 20b.

Figure 24:
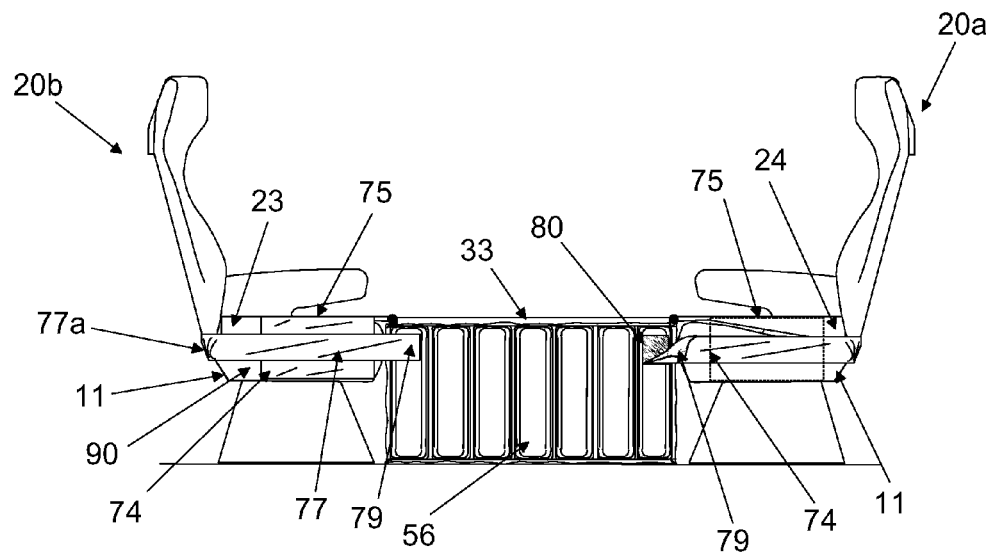
FIG. 24 shows cabin wall side view of the seats of FIG. 2 where the device of FIG. 16 is shown in a secured position with flexible belts extending around sides and a back of the seat structure to a releasable attachment on a side wall of the inflated foundation block and the lateral extensions are secured against the seat sides by the flexible belts.

FIG. 24 shows cabin wall side view of the seats 20a and 20b of FIG. 2 where the assembly 100 of FIG. 16 is shown in a secured position thereon. Flexible belts 77 extend around sides 90 and a back of the seat structure of seats 20a and 20b to a releasable attachment 80 on a side wall 56. Releasable attachment 79 is shown in one of belts 77 partially removed from attachment 80 on side wall 56. Lateral extensions 74 are shown held against sides 90 of seats 20a and 20b by belts 77 and in the position relative to filler pads 23 and 24 as shown in FIG. 19.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A device for forming a bed surface comprising:
    (a) two face to face passenger seats separated by and defining a separation space sufficient to allow persons seated in the passenger seats to rest their feet upon a floor surface without touching the other person's feet, where each passenger seat has a seat back, a seat cushion, and a support frame secured to the floor surface and supporting the seat cushion so that a top surface of the seat cushion is at a first elevation above the floor surface supporting the passenger seats, so that an inflatable foundation block has a first top surface, a bottom surface, two end walls and two side walls, where the bottom surface is supported by a floor surface between the two passenger seats, the end walls and side walls rise to support the top surface at about the first elevation, the top surface has a width about that of the seat cushion, the top surface has a length from a top of one end wall to a top of another end wall and equals about a distance between opposing front edges of the seat cushions of the passenger seats, and the entire foundation block is adapted to be collapsed in a stowage state and expanded in an installed state for supporting on the first top surface at about the first elevation a torso weight of a user by way of multiple structure internal baffles, each connecting an inside surface of the top surface, the bottom surface and the side walls; and
    (b) multiple straps extending from the foundation block around each of the support frames of the passenger seat so as engage the foundation block to the passenger seats so that the top surface of the foundation block extends between the opposing front edges of the seat cushions of the passenger seats in the installed state.

2. The device of claim 1 wherein the first top surface of the foundation block is covered with a top pad of uniform thickness affixed thereto, said top pad having a second top surface at an elevation at about the first elevation.

3. The device of claim 2 wherein the straps comprise one or more flexible extensions from the foundation block which extend around right and left sides of the two passenger seats.

4. The device of claim 3 wherein the flexible extensions extend continuously around the right sides, a back sides and the left sides of the two passenger seats.

5. The device of claim 4 wherein the two passenger seats are fixed to the floor by their support frames.

6. The device of claim 5 wherein the seat cushions comprise an elevated front edge at the first elevation and a back part at a lower elevation, where a filler pad is rotatably fixed to each of two edges of the top pad which are adjacent to the front edge in the installed state and each has a third top surface which is substantially co-planar with the second top surface when a conforming underside of each filler pad rests upon a top of the seat cushion in the installed state.

7. The device of claim 6 wherein the top pad and filler pads are enclosed in a flexible fabric envelope and are rotatably connected by an integral fabric section.

8. The device of claim 7 wherein each filler pad has a width about equal to the seat cushion width and has a length about equal to a distance from the front edge to the back part.

9. The device of claim 8 wherein a lateral extension comprises a relatively rigid plate and is rotatably connected by a connection edge to a length side of each filler pad, whereby, in the installed state, each lateral extension is located against a right or left side of each of the two passenger seats and secured thereto by the securing means.

10. The device of claim 9 wherein the bed surface comprises the second top surface and the two third top surfaces in the installed state.

11. The device of claim 10 wherein the lateral extensions are adapted to be rotated upward and around the rotatable connection to the filler pads so that each lateral extension lies on one of the third top surfaces in the stowage state.

12. The device of claim 11 wherein the filler pads are adapted to be rotated upward and around their rotatable connection to the top pad so that the third top surface of each filler pad lies on the second top surface in the stowage state.

13. The device of claim 12 wherein the foundation block is deflated and the device comprises a deflated elevation in the stowage state of less than half of the first elevation.

* * * * *